Figure 1:
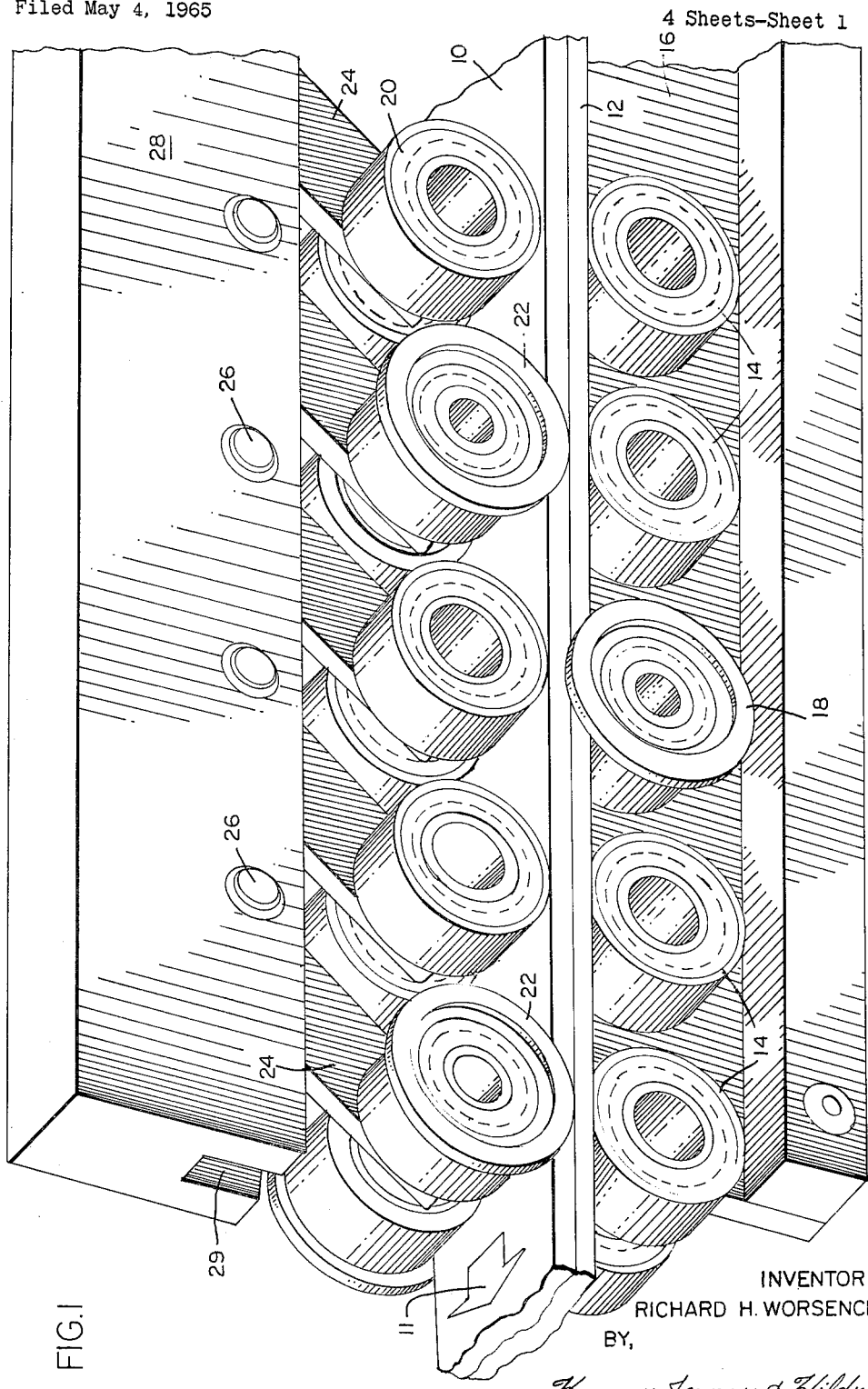

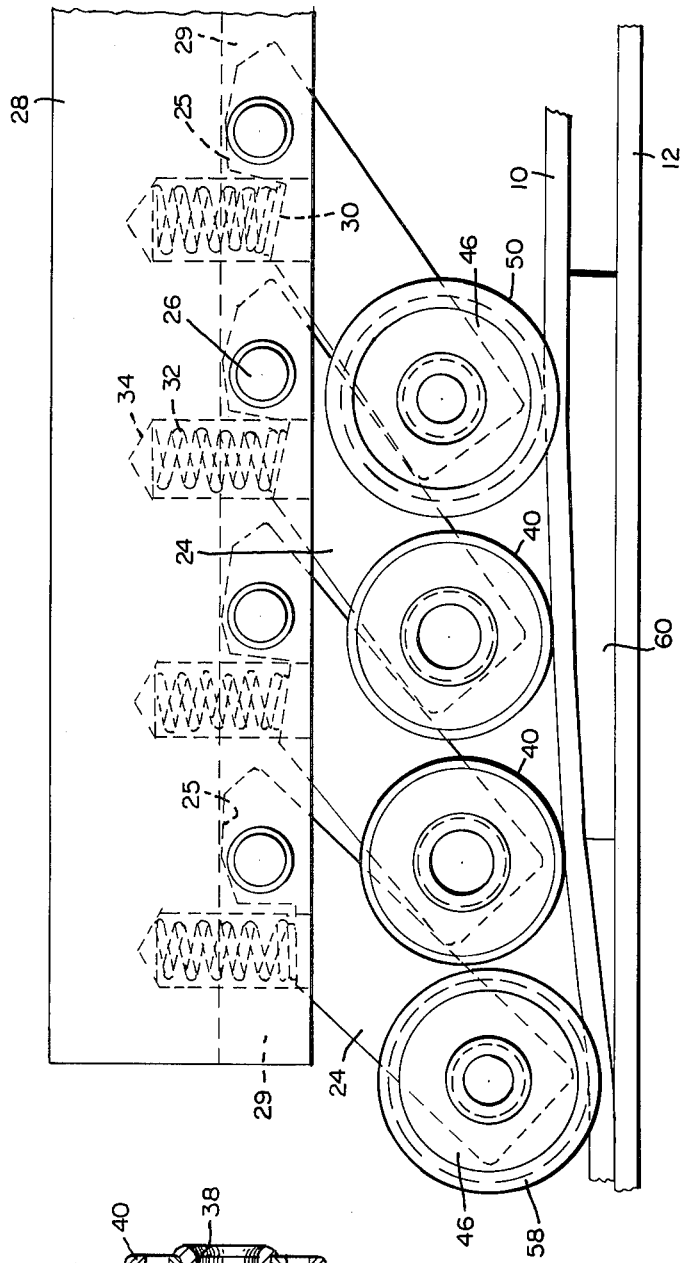
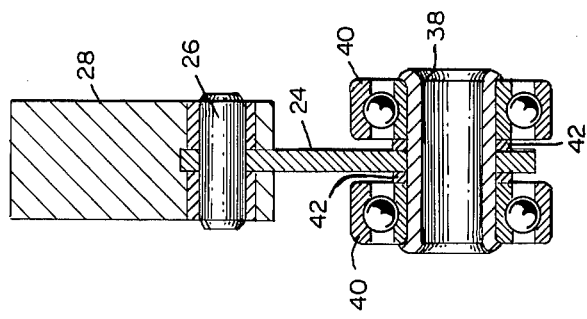

July 26, 1966

R. H. WORSENCROFT 3,262,545

CAGE ROLL STRUCTURE

Filed May 4, 1965

4 Sheets-Sheet 3

INVENTOR
RICHARD H. WORSENCROFT
BY,
Kenway, Jenney, & Hildreth
ATTORNEYS

INVENTOR
RICHARD H. WORSENCROFT
BY,
Kenway, Jenney, & Hildreth
ATTORNEYS

United States Patent Office 3,262,545
Patented July 26, 1966

3,262,545
CAGE ROLL STRUCTURE
Richard H. Worsencroft, Beverly, Mass., assignor to Post Machinery Company, Beverly, Mass., a corporation of Massachusetts
Filed May 4, 1965, Ser. No. 453,111
7 Claims. (Cl. 198—165)

My invention relates to cage roll structure useful in association with conveyor belts arranged to transport blanks, primarily used in box making machines such as straight-line gluers of the sort exemplified in United States Letters Patent No. 2,584,855 granted February 5, 1952, to Walter P. Fergnani.

In such machines superposed conveyor belts are often used to advance box blanks at a high rate of speed to instrumentalities for folding, breaking or gluing various parts of the blanks. Cage rolls are commonly employed to back up the belts and thus ensure that each blank will be securely engaged and controlled at all times by the belts. The duty imposed on such cage rolls is very severe, and the space available for them in the machine is extremely limited, particularly so in machinery for handling small or narrow box blanks, where narrow belts are required. Each roll must be individually spring pressed against the belt and be able to withstand the shock of the consecutive box blanks being advanced in some cases at a rate of several thousand per minute. Moreover, each roll must be maintained accurately in alignment at all times and in all positions to which it may be displaced by the passage of blanks of different thickness.

In the customary arrangement a lower conveyor belt is supported upon a series of rollers mounted in the frame of the machine for rotation on fixed axes. Overhanging the upper belt is a frame supporting a number of cage rollers which bear on the upper surface of the upper belt and which are provided with spring loaded mountings so that the rolls may yield upwardly as the upper belt is elevated by an amount equal to the thickness of a blank being carried between the upper and lower conveyor belts. The thicknesses of the blanks upon which a given machine may operate will vary rather widely from day to day, and that fact makes it important that the cage rollers be so mounted as to rise and fall easily and very quickly by varying amounts. Moreover, in order to maintain precise control of each blank at all times, the upper belt must be backed up by cage rolls spaced as closely together as possible.

The most important object of my invention is to improve the efficiency with which blanks may be transported or conveyed in a box making machine or in any similar type of equipment.

Another object of the invention is to increase the life of the working parts of blank conveying mechanisms.

An important feature of the invention resides in a frame or support mounted to overhang the upper of two superposed conveyor belts, a plurality of arms pivotally suspended from the frame and carrying at their lower ends rollers adapted to engage the upper surface of the upper conveyor belt, and spring means arranged to urge the arms downwardly toward the upper conveyor belt, the arms and rollers being so dimensioned and arranged that when any arm is elevated in response to the presence of a blank between the belts, it will encounter the next arm in the series without bringing any roller in contact with any other roller or, indeed, in contact with anything. The result is that no roller ever touches anything but the surface of the upper belt, and its life is not reduced by wear of the surface of the roller against anything but the surface of the belt.

Another feature of the invention is the angular disposition of the arms on which the rollers are mounted. Each arm is inclined from the vertical by a considerable angle, the result being that the elevation of the upper belt causes each roller to move through an arc about the axis upon which its arm is suspended from the frame. That arrangement is in contrast to the conventional mounting in which the rollers move vertically upwards, and my novel structure provides maximum yield of the rollers and also minimizes the distance between successive rollers. The angle at which each arm is normally presented is fixed by cooperating stop surfaces on the arm and the frame, the stop surfaces limiting the downward rotation of the arm about its mounting axis.

Figure 3:
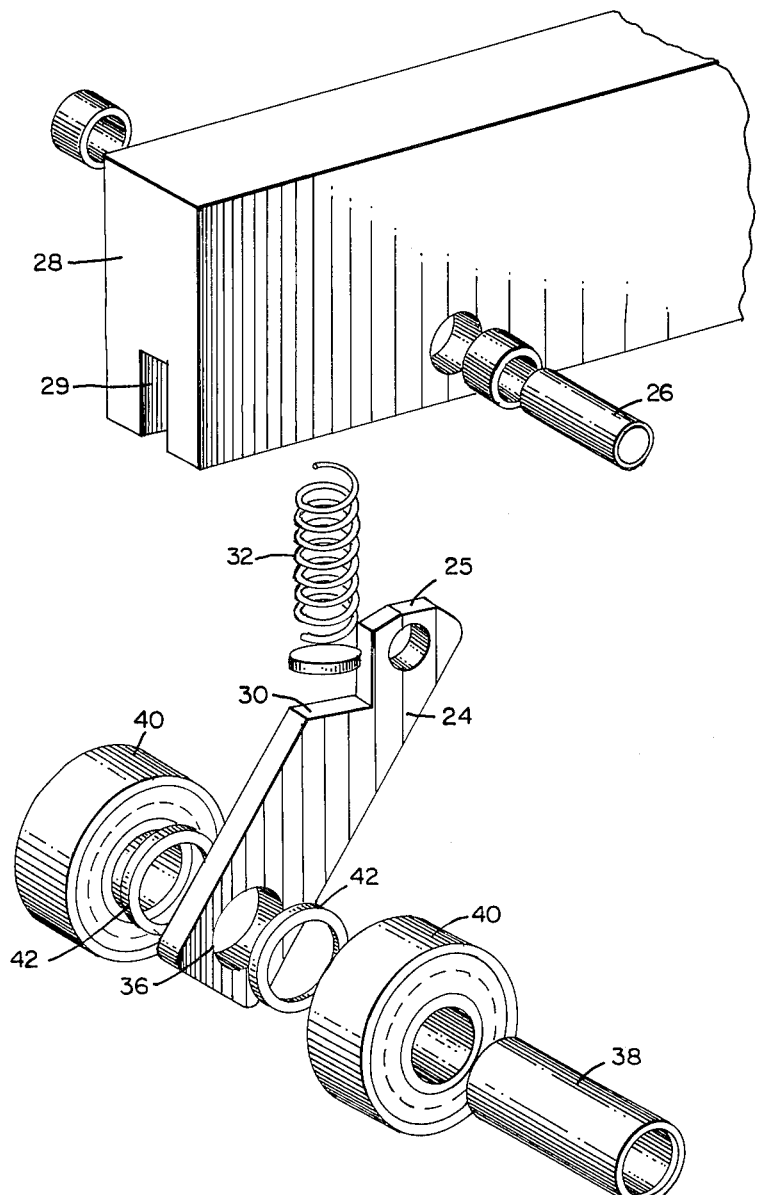
Figure 5:
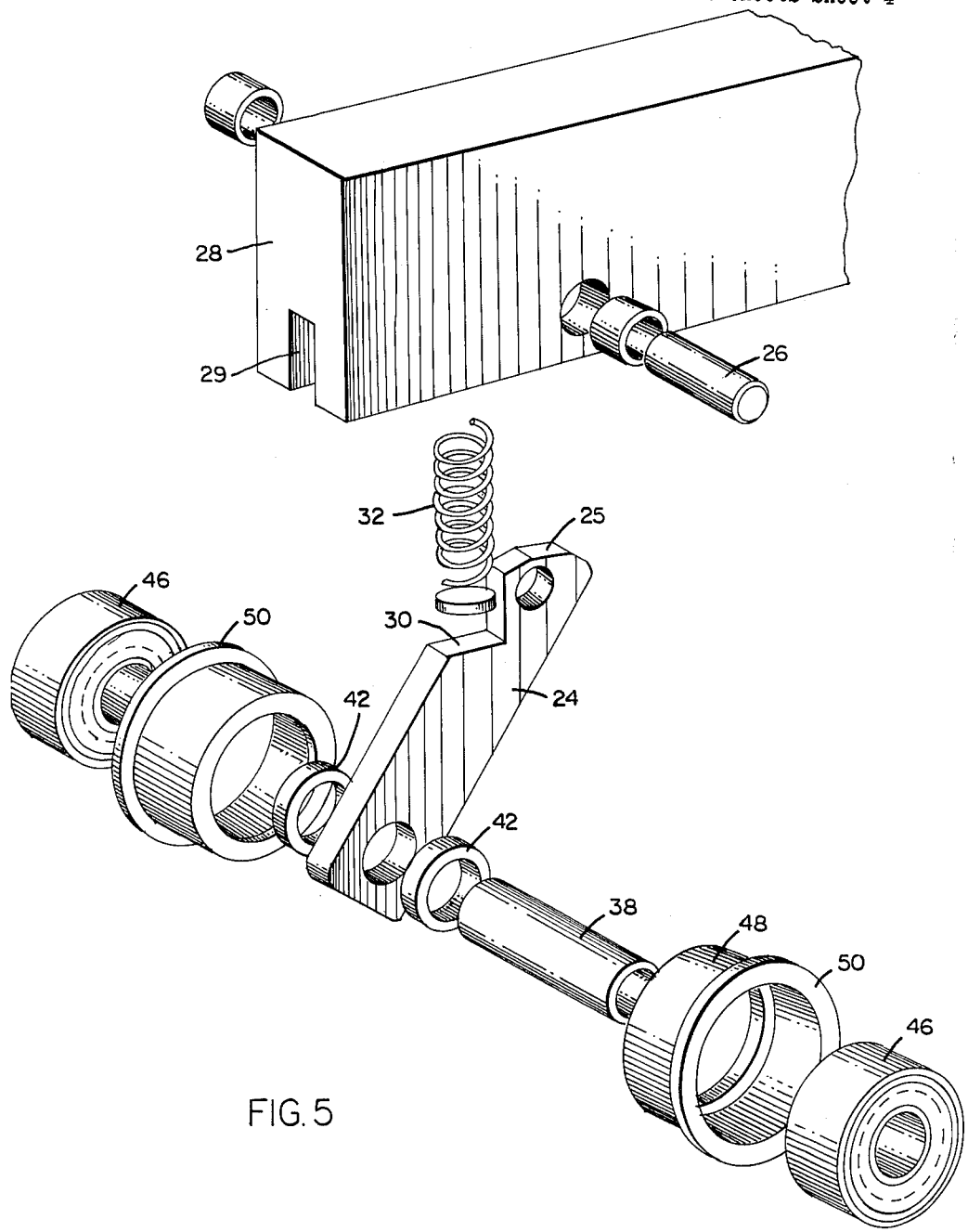

These and other objects and features of the invention will be more readily understood and appreciated from the following detailed description of a preferred embodiment thereof selected for purposes of illustration and shown in the accompanying drawings in which:

FIG. 1 is a view in perspective showing a portion of a cage roll structure constructed in accordance with the invention, together with the associated conveyor belts and rollers disposed to support the lower belt, FIG. 2 is a view in longitudinal cross section through a portion of the frame and illustrating the mounting of four consecutive arms and rollers, FIG. 3 is an exploded view in perspective showing the parts associated with a single roll and supporting arm, FIG. 4 is a view in cross section through a single pair of rolls and their supporting arm, and FIG. 5 is an exploded view in perspective of the parts associated with a single pair of flanged belt-guiding rollers, together with their supporting arm.

The general organization of a cage roll structure constructed in accordance with the invention is shown in FIG. 1 wherein it will be seen that there is provided a pair of conveyor belts comprising an upper belt 10 superposed upon a lower conveyor belt 12, the direction of movement being indicated by the arrow 11. The lower belt 12 is supported upon a plurality of rollers 14 mounted for rotation on fixed axes upon a frame member 16. At intervals along the array of rollers 14 there are provided rolls 18 mounted for rotation in similar fashion but provided with flanges for engaging the edge of the belt 12. The flanged rollers 18 serve to guide the belt 12 and keep it in proper track.

Overhanging the upper belt 10 is a frame member 28 having in its lower surface a continuous slot or channel 29; the frame 28 is provided with a series of transverse bores passing through the walls of the channel 29 at regular intervals, and each bore contains a pivot pin 26 providing a pivotal mounting for an arm 24. Thus the pivot pins 26 provide pivotal suspension means for the series of arms 24. The upper end of each arm 24 is provided with a flat surface 25 which butts against the upper surface of the channel 29 and serves as a stop limiting the extent to which the arm 24 may rotate in counterclockwise direction, with reference to FIG. 2. When the stop surfaces 25 encounter the upper surface of the channel 29 the arms are disposed at an angle of approximately 45° from the vertical, as represented by the attitude of the extreme left-hand arm in FIG. 2.

Each of the arms 24 is provided with a notch or shouldered portion 30 against which bears the lower end of a helical compression spring 32 received in a vertical bore formed by drilling upwardly from the bottom of the frame 28 and centered upon the center of the channel 29. The springs 32 urge the arms downwardly toward the surface of the upper belt 10.

As best shown in FIG. 3 the lower end of each arm 24 is provided with a transverse bore 36 receiving a hollow stub shaft 38 upon each end of which is mounted a ball bearing roller 40, of conventional construction. Each roller is spaced from the arm by a bushing or spacer 42, and the assembly of the parts is best shown in FIG. 3.

To prevent the upper belt 10 from departing from its assigned track, the rollers 40 are replaced at intervals, perhaps every third roller, by rollers 46 of smaller diameter than the rollers 40, but these smaller rollers 46 are each provided with outer bushings 48 provided with edge flanges 50, as best shown in FIG. 5. The flanges 50 serve as guides for the upper belt 10 and prevent it from wandering laterally from its assigned track.

In FIG. 2 there is shown, in section, a box blank 60 being carried between the belts 10 and 12. The upper belt 10 is displaced upwardly by an amount equal to the thickness of the blank 60 and, as a result, the three right-hand rollers have been rotated upwardly to the positions shown, whereas the extreme left-hand roller has not yet been displaced. It is extremely important to note that while all of the arms 24 shown in FIG. 2 are in contact with one another, the rollers are nowhere in contact with anything except the upper belt 10. As each roller is elevated in response to the upward displacement of the belt 10, its arm first moves upwardly against the action of its spring 32, without encountering anything in its travel. Further upward movement of the arm 24 brings it into contact with the next successive arm 24 in the series and causes it to serve as a cam bearing against the lower surface of the next arm to cause that arm to begin to rise. That action is rapid as the blank travels through the machine, and the result is a very smooth and extremely fast response, the action of the arms and rollers instantaneously conforming to the upward travel of the upper belt but without for an instant losing precise control and constantly subjecting the blank to continuous squeezing action of the two belts, the result is that the blanks are always firmly held against displacement or twisting, a factor vitally necessary to the performance of such machines.

Those skilled in the art will readily appreciate the advantages of my novel cage roll structure and will appreciate that the exact construction shown in the drawings and described above may be varied in many respects without departing from the spirit of the invention as set forth in the appended claims.

Having thus disclosed my invention, what I claim as new and desire to secure by Letters Patent of the United States is:

1. An improved cage roll structure for blank conveying machinery, comprising a frame, a plurality of arms pivotally suspended from said frame, stop surfaces on said frame and arms cooperating to limit rotation of said arms in one direction beyond a predetermined angle of inclination, spring means urging said arms to the stopped position, a pair of rollers rotatably mounted upon the lower end of each of said arms, one roller on each side of the arm, the rollers and arms being so dimensioned that upon rotation of any arm against its spring the arm meets the adjacent arm without bringing any of the rollers in contact.

2. An improved cage roll structure for box blank conveyors, comprising a frame, a series of arms pivotally suspended from said frame, a stop upon each arm cooperating with a stop upon the frame for limiting rotation of the arms beyond a predetermined angle of inclination, a spring mounted on the frame and urging each arm to stopped position, a pair of rollers mounted at the end of each arm, one on each side thereof, the arms and rollers being so dimensioned that upon rotation of any arm against its spring the arm will come in contact with an adjacent arm without bringing any roller in contact with another.

3. A cage roll structure for box making machines, comprising a frame, a plurality of arms pivotally suspended from said frame, cooperating stop surfaces on said frame and arms to limit rotation of said arms at a predetermined angle from the vertical, a spring bearing on the frame and each arm for urging the arms to stopped position, a pair of superposed conveyor belts disposed beneath said arms, a roller mounted at the end of each arm and bearing upon the upper belt, a plurality of rollers mounted on fixed axes in position to underlie and support the lower belt, the dimensions and array of said arms being so arranged that upon upward movement of an arm in response to elevation of the upper belt, the arm will contact an adjacent arm without bringing any roller in contact with another.

4. Cage roll structure for box machinery, comprising a lower belt, a plurality of rollers rotatably mounted on fixed axes in position to support said lower belt, an upper belt overlying said lower belt, a frame overhanging said upper belt, a series of arms pivotally suspended from said frame, a roller mounted for rotation at the end of each arm, a spring mounted in said frame and bearing on each arm to urge the roller into contact with said upper belt, the arms being so dimensioned and arranged that when an arm is rocked against its spring the arm comes in contact with an adjacent arm without bringing any rollers in contact.

5. Cage roll structure for box machinery as defined in claim 4, further characterized in that each arm is provided with a cam surface located in position to engage and lift the next succeeding arm in the series upon being itself lifted by an underlying box blank.

6. Cage structure for box machinery as defined in claim 4, further characterized in that each arm is provided with a cam surface arranged to underlie a lower surface of the next successive arm in the series.

7. Cage roll structure for box machinery as defined in claim 4, further characterized in that the first arm of the series has an inclined cam surface arranged to engage and rock upwardly the next successive arm of the series against spring pressure when the first arm is displaced by passage of a box blank.

References Cited by the Examiner

UNITED STATES PATENTS 2,508,216  5/1950  Bonds _____ 198—165 X
2,664,927  1/1954  Pierce _____ 198—165 X EVON C. BLUNK, *Primary Examiner.*

R. E. AEGERTER, *Assistant Examiner.*